(12) United States Patent
Sekihara et al.

(10) Patent No.: US 6,546,627 B1
(45) Date of Patent: Apr. 15, 2003

(54) REPAIR METHOD FOR A GAS TURBINE

(75) Inventors: Masaru Sekihara, Hitachi (JP); Shigeo Sakurai, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/824,641

(22) Filed: Apr. 4, 2001

(30) Foreign Application Priority Data

Sep. 14, 2000 (JP) ........................................ 2000-285230

(51) Int. Cl.$^7$ .................................................. B23P 6/00
(52) U.S. Cl. ................ 29/889.1; 29/889.22; 29/402.08; 60/752
(58) Field of Search .......................... 29/402.03, 402.08, 29/888, 889.1, 889.22; 60/752, 754; 415/117, 208.1

(56) References Cited

U.S. PATENT DOCUMENTS

| | | | | |
|---|---|---|---|---|
| 3,433,015 A | * | 3/1969 | Sneeden | 415/117 |
| 4,017,207 A | * | 4/1977 | Bell et al. | 415/117 |
| 4,302,148 A | * | 11/1981 | Tubbs | 415/117 |
| 6,416,278 B1 | * | 7/2002 | Caddell et al. | 29/402.03 |
| 6,425,738 B1 | * | 7/2002 | Shaw | 415/208.1 |

* cited by examiner

Primary Examiner—Michael Koczo
(74) Attorney, Agent, or Firm—Antonelli, Terry, Stout, Kraus, LLP

(57) ABSTRACT

A gas turbine has a compressor for compressing air as a working fluid, a combustor for producing combustion gas by mixing fuel with the compressed air, and a turbine for generating a rotating force at the time of expansion of combustion gas. The gas turbine further includes a cylindrical liner; a transition piece for transferring the working fluid from the liner to the turbine; an outlet portion of the transition piece, which has a region parallel with a direction of a rotating shaft of the turbine; cooling holes formed in the region so that longitudinal intervals thereof are lengthened; and a picture frame portion provided to secure stiffness at an outlet of the outlet portion.

4 Claims, 14 Drawing Sheets

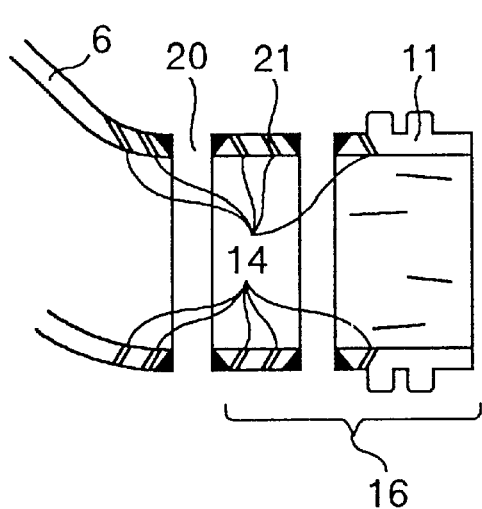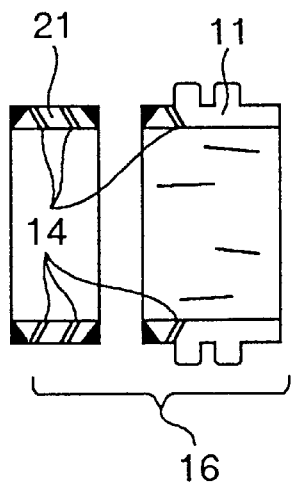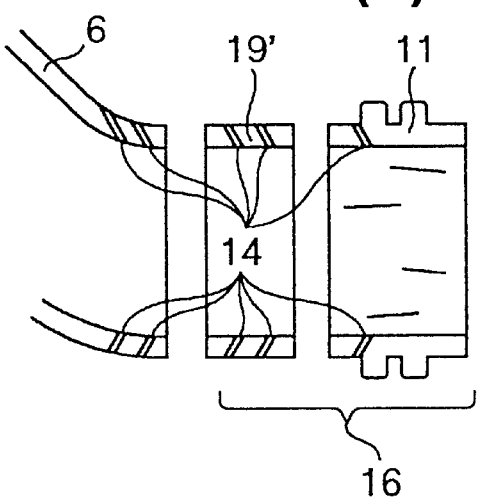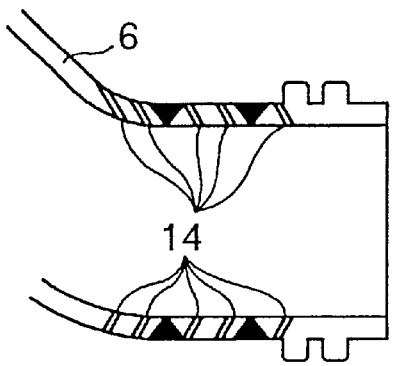

FIG. 12(a) FIG. 12(b) FIG. 12(c)
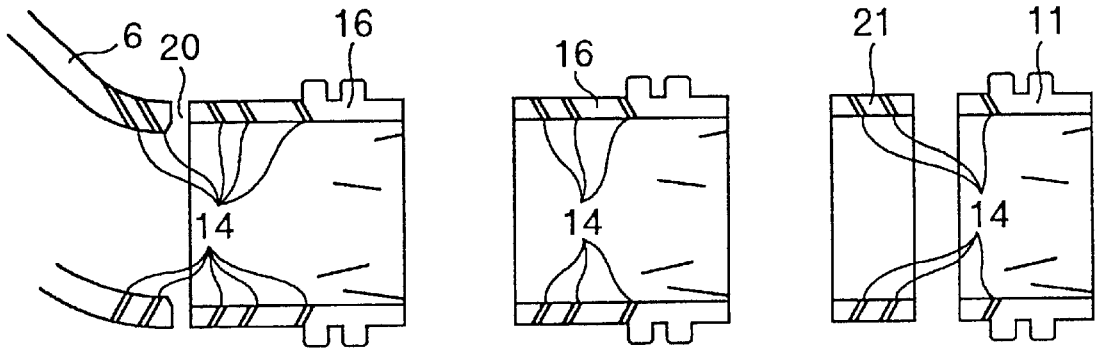
FIG. 12(d) FIG. 12(e)
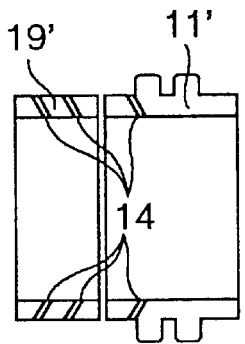 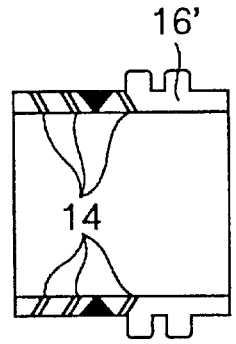
FIG. 12(f) FIG. 12(g)
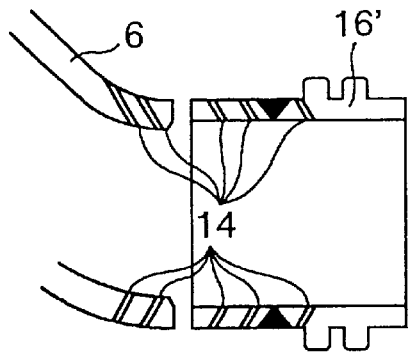 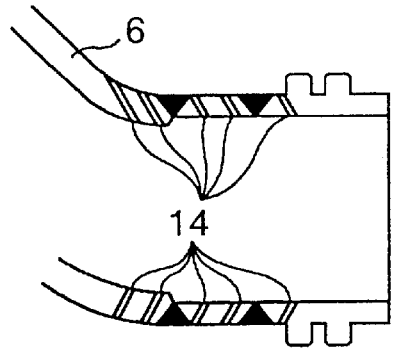

FIG. 14(a) FIG. 14(b) FIG. 14(c)
FIG. 14(d) FIG. 14(e)
FIG. 14(f) FIG. 14(g)
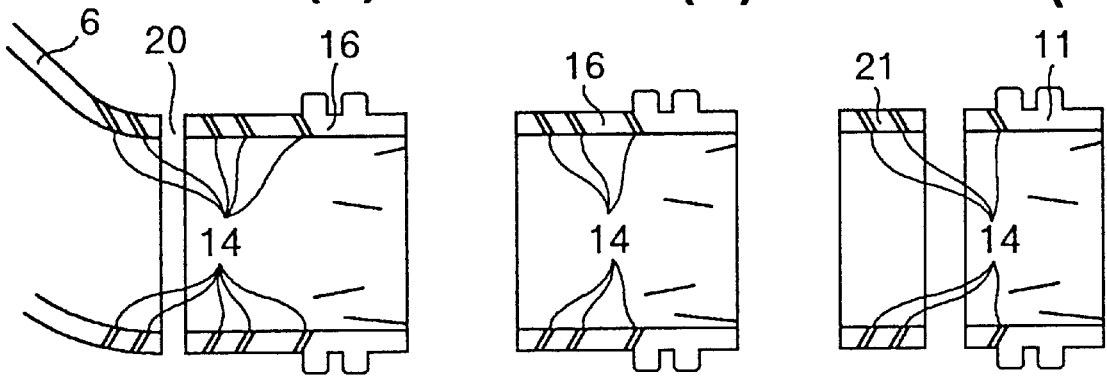
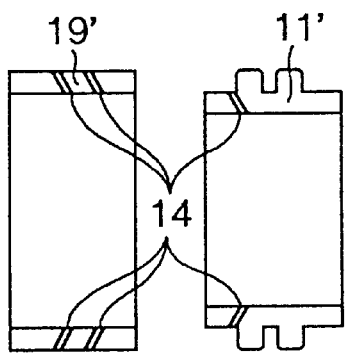
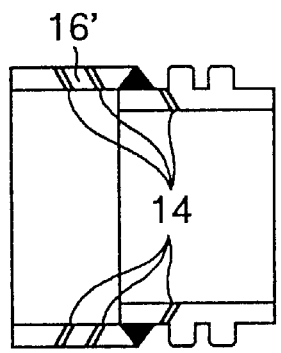
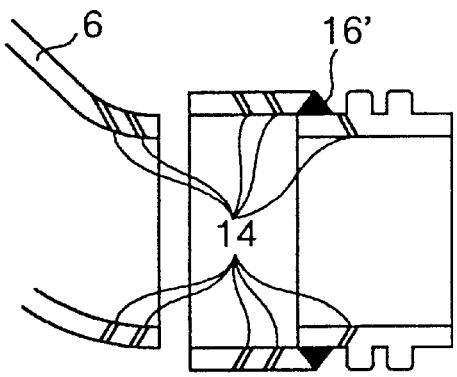
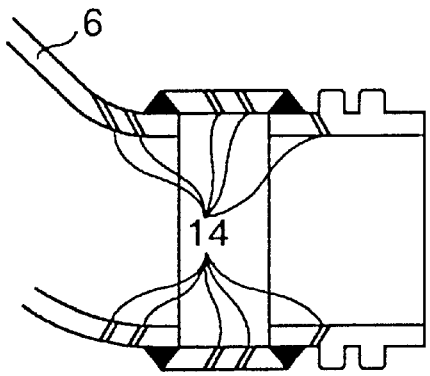

REPAIR METHOD FOR A GAS TURBINE

BACKGROUND OF THE INVENTION

The present invention relates to a combustor that is a component of a gas turbine, more particularly, relates to a transition piece for transferring a working fluid having been burnt to an annular flow path of a gas turbine through a cylindrical liner and a repair method therefor.

As a method for repairing a transition piece of a combustor, a method in which cracks are repaired and residual stress is relieved and wear resistance is improved by combining shot peening and solution heat treatment has been known and has been disclosed in JP-A-6-288549 specification, for example.

However, it has been demanded that the above-described prior art be improved more to achieve high efficiency for energy saving, increased strength and prolonged service life of an outlet portion of combustor, and decreased repair and inspection manpower.

SUMMARY OF THE INVENTION

An object of the present invention is to achieve energy saving, increased strength, prolonged service life, and decreased repair and inspection manpower while facilitating the replacement and repair of a transition piece of a combustor.

To attain the above object, the present invention provides a gas turbine comprising a compressor for compressing air as a working fluid, a combustor for producing combustion gas by mixing fuel with the compressed air, and a turbine for generating a rotational power at the time of expansion of the combustion gas, and further comprising a cylindrical liner; a transition piece for transferring the working fluid from the liner to the turbine; an outlet portion of the transition piece, which has a region parallel with the direction of rotating shaft of the turbine; cooling holes formed in the region so that the longitudinal intervals thereof are lengthened; and a picture frame portion provided to secure stiffness near the outlet of the outlet portion.

Also, the present invention provides a repair method for a gas turbine having a compressor for compressing air as a working fluid, a combustor for producing combustion gas by mixing fuel with the compressed air, and a turbine for generating a rotational power at the time of expansion of the combustion gas, comprising providing, at an outlet portion of a transition piece for transferring the working fluid to the turbine, a region parallel with the direction of rotating shaft of the turbine, cooling holes formed in the region so that the longitudinal intervals thereof are lengthened, and a picture frame portion to secure stiffness near the outlet of the outlet portion; cutting the outlet portion in a portion where the longitudinal intervals of the cooling holes are lengthened and separating the picture frame portion, and welding a picture frame portion prepared in advance in the cut portion for replacement.

Further, in the repair method described above, it is preferable that deterioration in the cut portion be evaluated, and the surface temperature state of the outlet portion be estimated, whereby the arrangement of the cooling holes be determined.

Further, in the repair method described above, the picture frame portion prepared in advance is preferably another picture frame portion that has been repaired and is reused.

Further, in the repair method described above, the length of the whole of the transition piece is preferably adjusted by grinding the end face of the cut-off picture frame portion.

Further, in the repair method described above, the picture frame portion is preferably welded to the cut portion via a connecting member.

Further, in the gas turbine described above, the picture frame portion is preferably welded via a connecting member formed with cooling holes.

BRIEF DESCRIPTION OF THE DRAWINGS

FIGS. 7(a)–7(d) are views showing a repair method (procedure) for a transition piece of still another embodiment in accordance with the present invention;

FIG. 12 is views showing a repair method (procedure) for a transition piece of still another embodiment in accordance with the present invention;

FIGS. 12(a)–12(g) are views showing a repair method (procedure) for a transition piece of still another embodiment in accordance with the present invention;

FIGS. 14(a)–14(g) are views showing a repair method (procedure) for a transition piece of still another embodiment in accordance with the present invention;

PREFERRED EMBODIMENTS OF THE INVENTION

Embodiments of the present invention will now be described with reference to the accompanying drawings.

Figure 2:
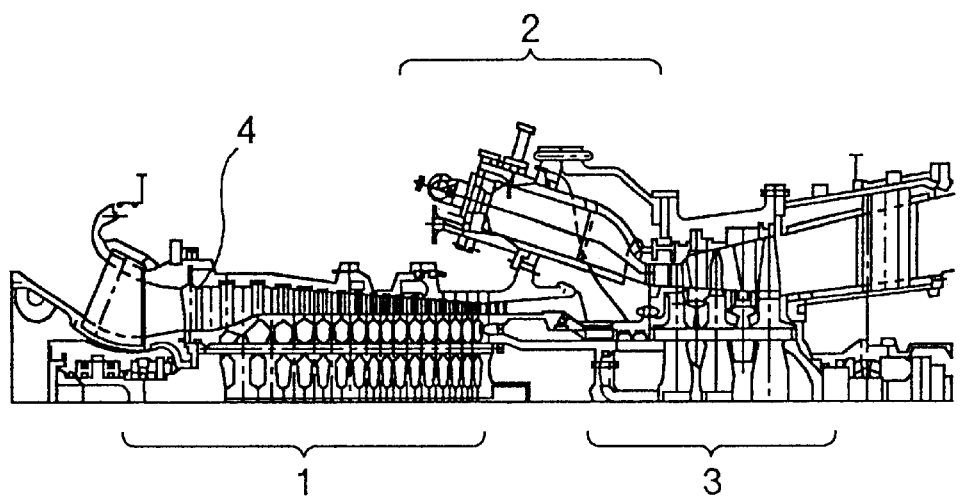
FIG. 2 is a sectional view showing a construction of a conventional gas turbine.

FIG. 2 is a sectional view showing a general construction of a gas turbine. The gas turbine mainly comprises a compressor 1, a combustor 2 and a turbine 3. The compressor 1 adiabatically compresses air sucked from the atmosphere into a gas path 4 as a working fluid. The combustor 2 mixes fuel with the compressed air supplied from the compressor 1 and burns the mixture to produce a high-temperature and high-pressure gas. The turbine 3 generates rotational power when the combustion gas introduced from the combustor 2 expands. Exhaust from the turbine 3 is discharged into the atmosphere. The remaining power, which is the result of subtraction of the power for driving the compressor 1 from the rotational power generated by the turbine 3, is the power generated by the gas turbine, which drives a generator.

Figure 1B:
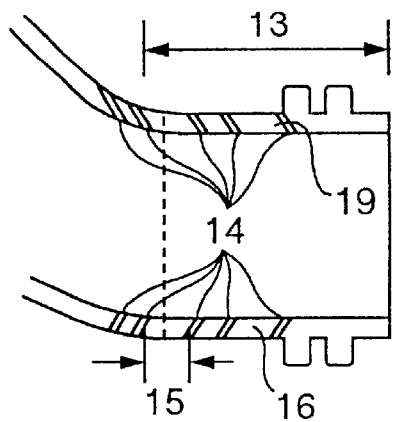
FIG. 1a is a sectional view showing a transition piece construction of one embodiment in accordance with the present invention and FIG. 1b is an enlarged view of a portion of FIG. 1(a)
Figure 1A:
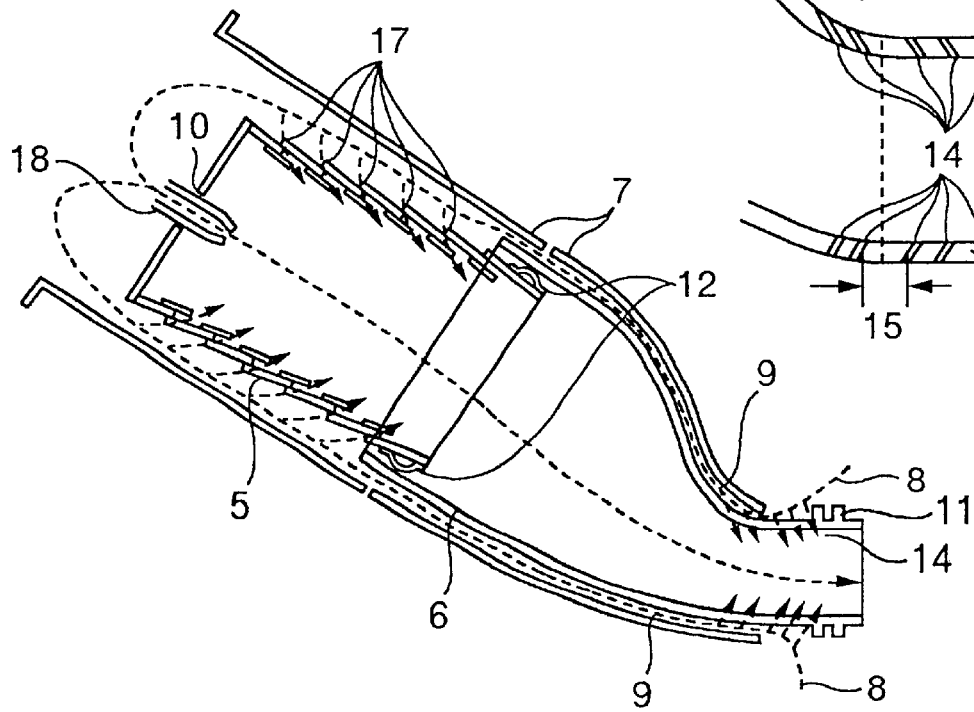

As shown in FIG. 1a, the combustor 2 includes a liner 5, a transition piece 6, and a flow sleeve 7 located on the outside of the liner 5 and the transition piece 6 to accelerate cooling.

The transition piece 6 has an inlet of a cylindrical shape and an outlet of an inverse trapezoidal shape. On the transition piece 6, an external pressure caused by discharge air of the compressor 1 is exerted on the outside surface, and an internal pressure caused by combustion gas is exerted on the inside. Therefore, in comparison with the cylindrical shape to which the pressure uniformly acts, the inverse trapezoidal shape is more easily subjected to creep deformation. Especially on the outlet side, the metal temperature increases because the gas flow path area is decreased as compared with the area on the inlet side and therefore the outlet side is exposed to a high-temperature environment, so that the creep deformation tends to become still more remarkable. The outlet portion exposed to a harsh environment in this manner is most susceptible to damage including wear and thermal fatigue of fitting portion and cracks caused by creep, so that the outlet portion is supposed to be a part that governs the service life of transition piece.

For a recent gas turbine facility, increased output has been demanded to respond to an increase in power demand in the summer, and also high efficiency has been demanded to save energy.

As means for increasing the output, there is a tendency for the annular flow path area, that is, the size of the gas turbine to be increased. Also, as means for increasing the efficiency, there is a tendency for the pressure ratio of compressor to be increased. Both of these means lead to an increase in pressure load applied to the combustor, so that it is expected that the combustor will be subjected to still higher pressure load in the future. As a necessary consequence, increased strength and prolonged service life of the outlet portion are demanded.

Further in recent years, as a social demand for a reduction in electric fee increases, it has been of urgent necessity to reduce the power generation cost. In particular, the repair cost of high-temperature parts such as the combustor and the moving and stationary blades of turbine accounts for a large percentage of the repair cost of gas turbine. Therefore, a decrease in period and manpower of periodic inspection has been demanded.

Further, since the load environment at an actual power station varies, an initial cooling design is sometimes not necessarily the optimum design. Therefore, the cooling design properly corresponding to the load environment is also of importance to the prolonged service life of transition piece.

Referring to FIG. 1(a), a working fluid 8 discharged from the compressor 1 is introduced to a gap 9 between the flow sleeve 7 and the transition piece 6. The flow velocity of the working fluid 8 in the gap 9 increases, so that the cooling effect on the outside surface of the transition piece 6 is enhanced.

In a diffusion combustion type combustor, in which fuel is not mixed with air before combustion, some of the working fluid 8 flowing through the gap 9 is introduced into the interior of the liner 5 through cooling holes 17 formed in the outside surface of the liner 5 to cool the liner 5, and the remainder thereof flows into the interior of the liner 5 together with fuel sprayed through a nozzle 10 to be used for combustion.

As shown in FIG. 1(a), the fuel spray nozzle 10 is inserted in an insertion portion 18 provided on the inlet side of the liner 5. The working fluid 8 having been burnt is discharged into an annular flow path of the turbine 3 from the liner 5 through the transition piece 6.

A plate spring 12 is welded to the outlet side of the liner 5 and the liner 5 is inserted in the transition piece 6. The transition piece 6 is contained in the flow sleeve 7 with the liner 5 inserted in the inlet portion thereof via the plate spring 12, and is supported on the inlet side by a fitting portion that restrains only deformation in the circumferential direction of an inlet cross section. Also, near the outlet of the transition piece 6, a picture frame portion 11 is provided to increase the stiffness.

The flow sleeve 7 is supported on the inlet side with the transition piece 6 by a fitting portion that restrains only deformation in the circumferential direction of inlet cross section, and likewise, it is supported by a casing via a fitting portion that restrains only deformation in the circumferential direction of inlet cross section. On the outlet side of the flow sleeve 7, the position of the flow sleeve 7 is determined by being connected with the casing together with the transition piece 6.

Figure 3A:
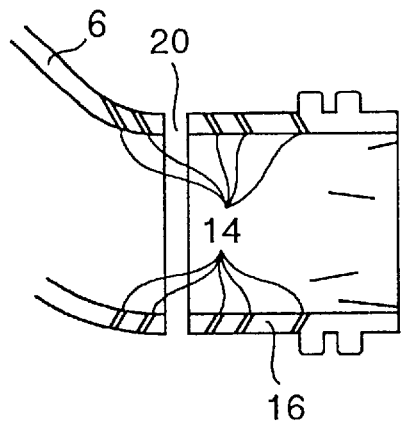
FIGS. 3(a)–3(g) are views showing a repair method (procedure) for a transition piece of one embodiment in accordance with the present invention.
Figure 3B:
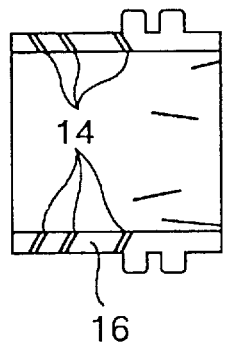

As shown in FIGS. 3(a) and 3(b), an outlet portion 16 consisting of the picture frame portion 11 having ribs and a connecting member 19 for length adjustment formed with cooling holes 14 is provided with a region 13 parallel with the direction of a gas turbine rotating shaft as shown in FIG. 1(b). The longitudinal intervals of the cooling holes 14 in the outlet portion are lengthened. Thereby, the cutting operation of the outlet portion 16 is made easy.

Figure 3C:
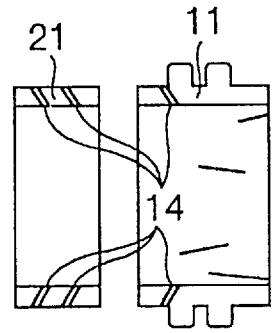

As shown in FIG. 3(c), a damaged outlet portion 16 is cut at a portion where the longitudinal intervals of the cooling holes 14 are lengthened to divide the outlet portion 16 into the picture frame portion 11 having ribs and a region 21 with a constant plate thickness. Wear and cracks occurred in the picture frame portion 11 are repaired for reuse.

Figure 3D:
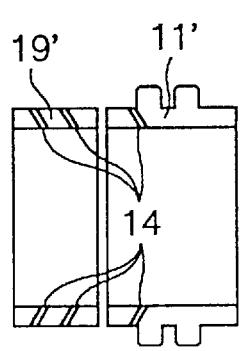
Figure 3E:
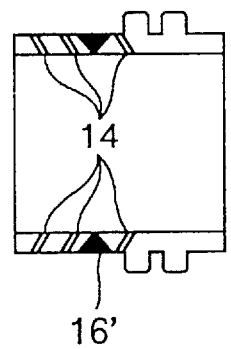
Figure 3F:
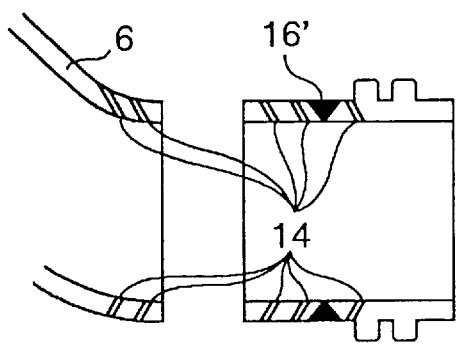
Figure 3G:
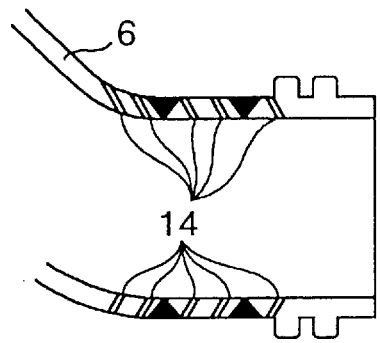

Further, a picture frame portion 11' and a length adjusting connecting member 19' formed with cooling holes 14 shown in FIG. 3(d) that have been prepared in advance are welded to each other to form a replacement outlet portion 16' as shown in FIG. 3(e). Then, the outlet portion 16' is welded to the transition piece 6 as shown in FIGS. 3(f) and 3(g).

With the above-described repair method, only the damaged outlet portion 16 is replaced rapidly, and the cut-off outlet portion 16 is repaired separately. Therefore, the replacement and repair cost can be reduced, and the service life of the transition piece and the whole of gas turbine can be prolonged.

When the replacement outlet portion 16' is welded to the transition piece 6, the end face of the connecting member 19' for length adjustment is preferably ground to adjust the length of the whole of transition piece.

Figure 4A:
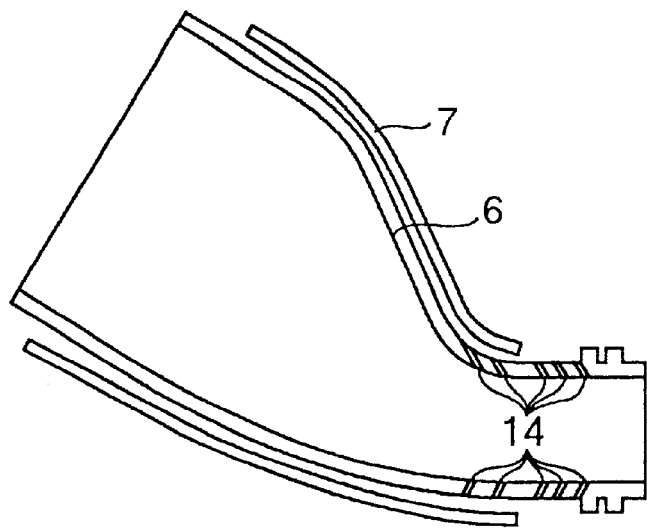
FIGS. 4(a)–4(c) are sectional views showing an outlet portion of a transition piece of one embodiment in accordance with the present invention.
Figure 4B:
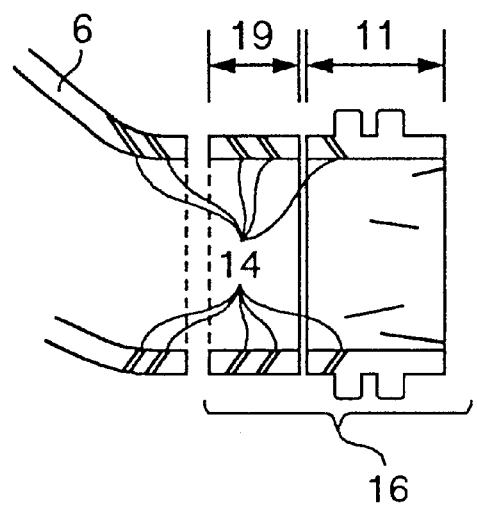
Figure 4C:
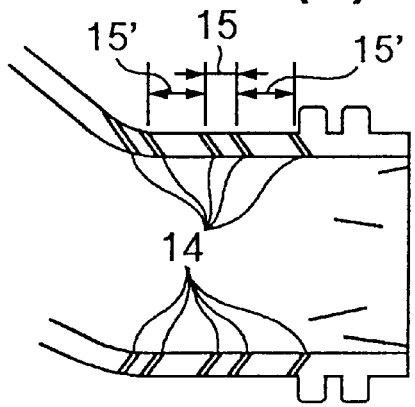
Figure 5A:
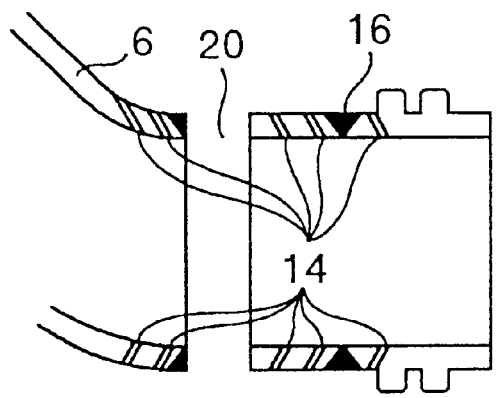
FIGS. 5(a)–5(e) are views showing a repair method (procedure) for a transition piece of another embodiment in accordance with the present invention.
Figure 5B:
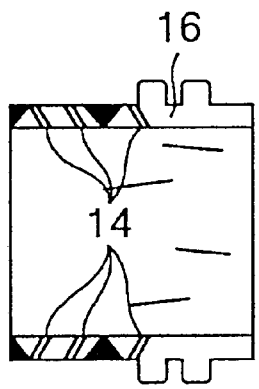
Figure 5C:
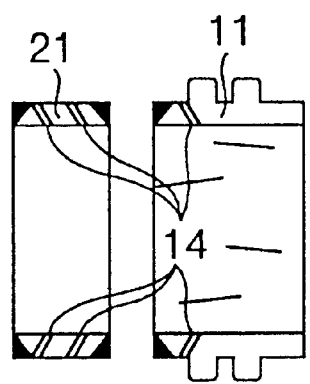
Figure 5D:
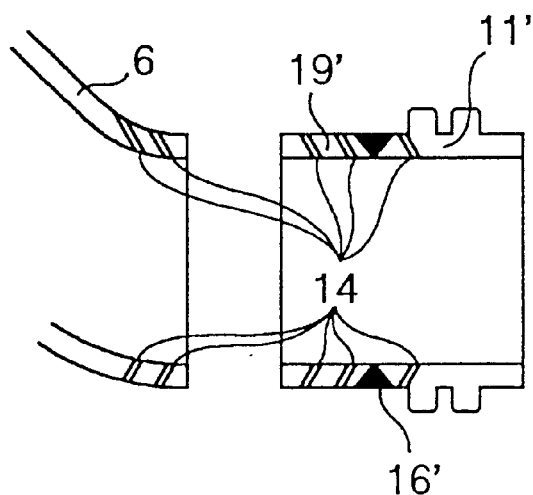
Figure 5E:
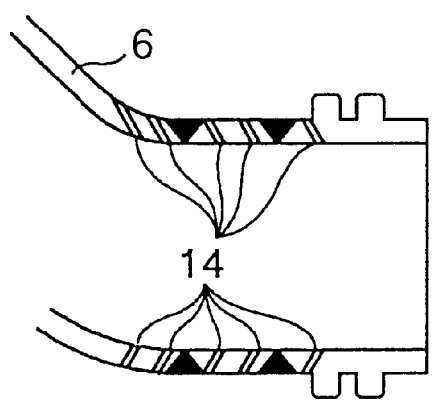
Figure 6A:
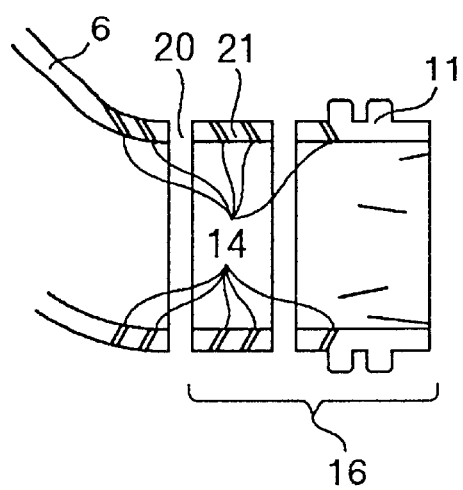
FIGS. 6(a)–6(d) are views showing a repair method (procedure) for a transition piece of still another embodiment in accordance with the present invention.
Figure 6B:
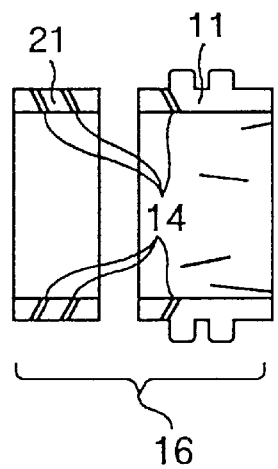
Figure 6C:
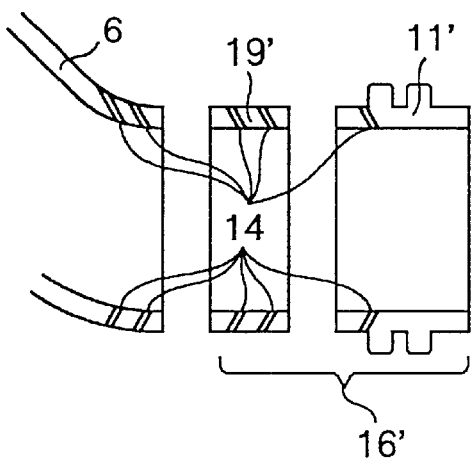
Figure 6D:
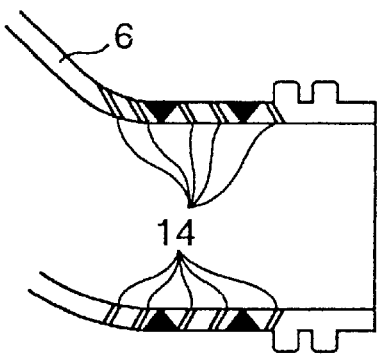

As shown in FIGS. 4(a) and 4(b), the outlet portion 16 consists of the picture frame portion 11 and the connecting member 19, and has a region parallel with the gas turbine rotating shaft, and as shown in FIG. 4(*c*), the longitudinal intervals of the cooling holes 14 are lengthened. Therefore, the cut-off of the outlet portion 16 and the welding of the spare part thereof are made easy.

Also, for the transition piece 6 once replaced, as shown in FIG. 5(*a*), a damaged outlet portion 16 is cut off in a cutting plane 20. The cutoff outlet portion 16 shown in FIG. 5(*b*) is divided into the picture frame portion 11 and the region 21 with a constant plate thickness, as shown in FIG. 5(*c*). Wear and cracks occurred in the picture frame portion 11 may be repaired for reuse.

As shown in FIGS. 6(*a*) and 6(*b*), a damaged outlet portion 16 may be cut off at the cutting plane 20 and at a position between the picture frame portion 11 and the region 21 with a constant plate thickness into the picture frame portion 11 having ribs and the region 21 with a constant plate thickness. In this example, as shown in FIGS. 6(*c*) and 6(*d*), the connecting member 19 formed with the cooling holes 14 is welded to the transition piece 6 and the picture frame portion 11' is welded to the connecting member 19'.

Also, for the transition piece 6 once replaced, as shown in FIGS. 7(*a*) and 7(*b*), the outlet portion 16 may be cut in the cutting plane 20 and at a position between the picture frame portion 11 and the region 21 with a constant plate thickness, and wear and cracks occurred in the picture frame portion 11 may be repaired to reuse the picture frame portion 11.

Figure 8A:
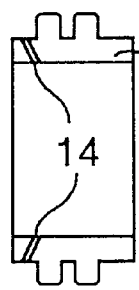
FIGS. 8(a)–8(c) are sectional views showing a picture frame portion of one embodiment in accordance with the present invention.
Figure 8B:
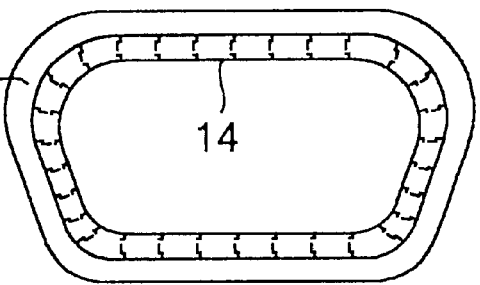
Figure 8C:
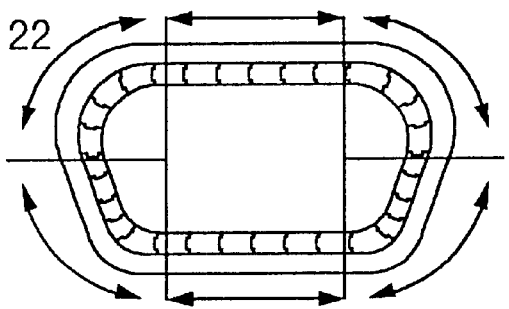
Figure 9:
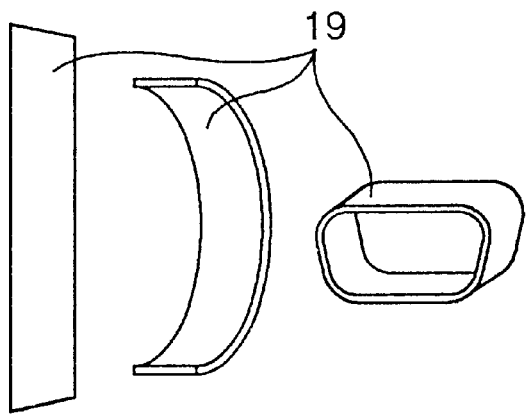
FIG. 9 is a view showing formation of a connecting member of one embodiment in accordance with the present invention.

FIGS. 8(*a*)–8(*c*) are sectional views of the picture frame portion 11 constituting the outlet portion 16. The cooling holes 14 may be formed at the whole periphery of the picture frame portion 11, or may be formed at the partial periphery thereof to effect cooling efficiently. Also, as shown in FIG. 8(*c*), the picture frame portion 11 is divided into several pieces in the circumferential direction, and when wear and cracks occurred in the picture frame portion 11 are repaired, a divided piece 22 is cut off, and a replacement divided piece 22' is welded. Thereby, the work can be made easy, and the cost can be made relatively low because the cooling holes 14 can be made in the connecting member 19 after the plate has been bent as shown in FIG. 9.

Figure 10:
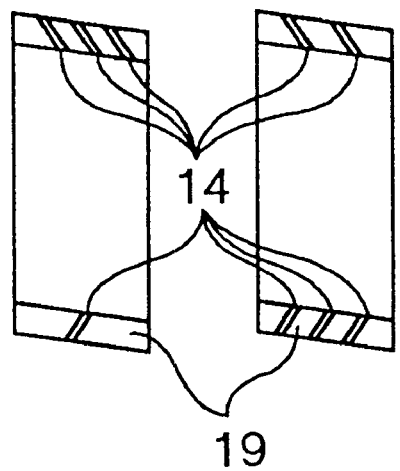
FIG. 10 is a sectional view showing intervals between cooling holes of one embodiment in accordance with the present invention.
Figure 11:
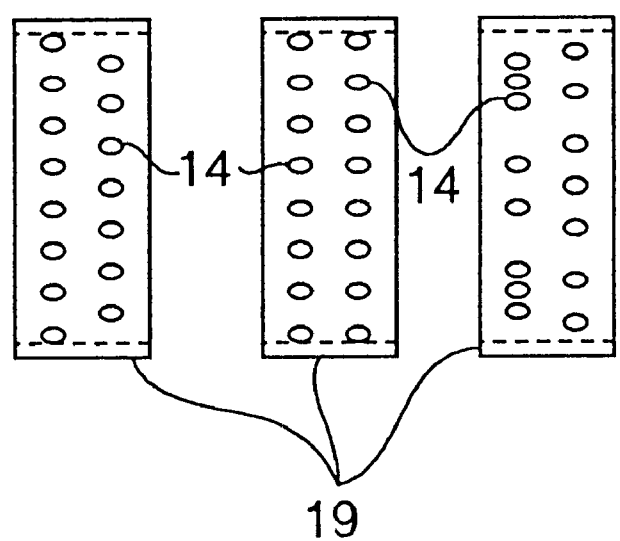
FIG. 11 is a side view showing arrangement of cooling holes of one embodiment in accordance with the present invention.
Figure 13A:
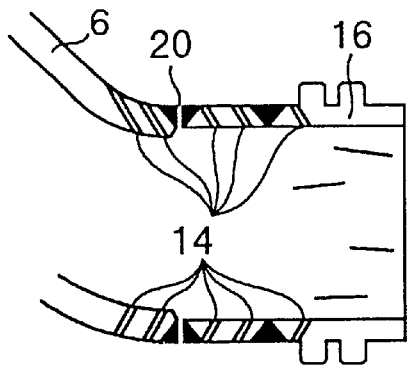
FIGS. 13(a)–13(e) are views showing a repair method (procedure) for a transition piece of still another embodiment in accordance with the present invention.
Figure 13B:
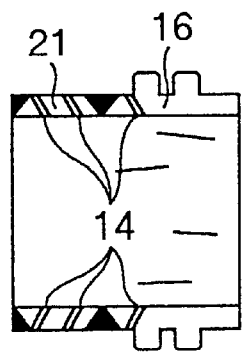
Figure 13C:
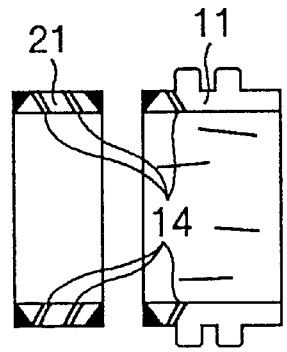
Figure 13D:
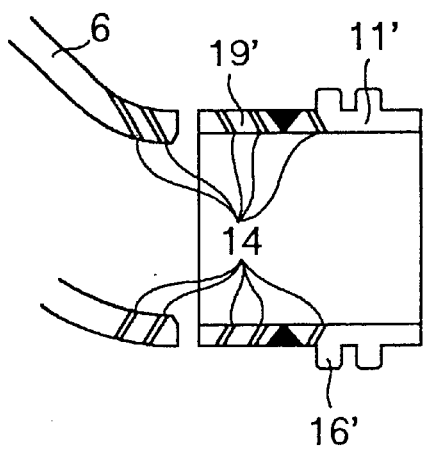
Figure 13E:
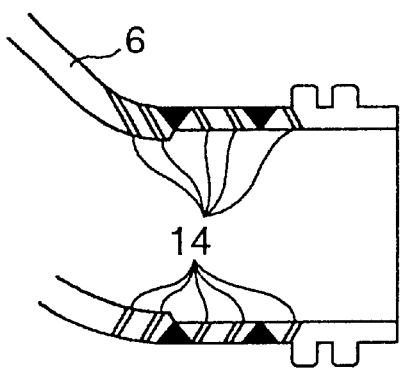
Figure 15A:
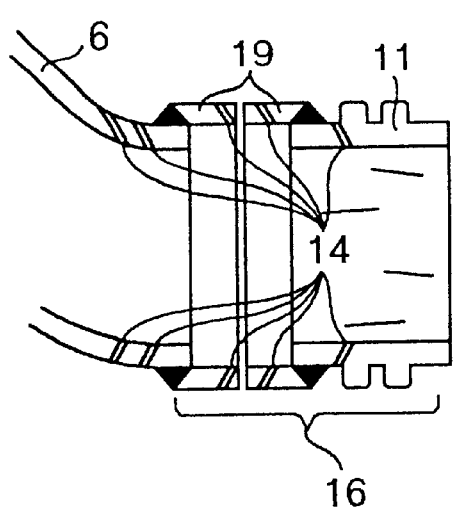
FIGS. 15(a)–15(d) are views showing a repair method (procedure) for a transition piece of still another embodiment in accordance with the present invention.
Figure 15B:
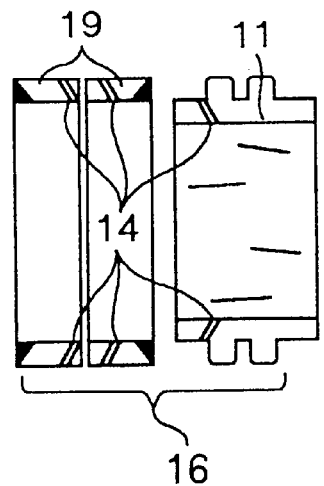
Figure 15C:
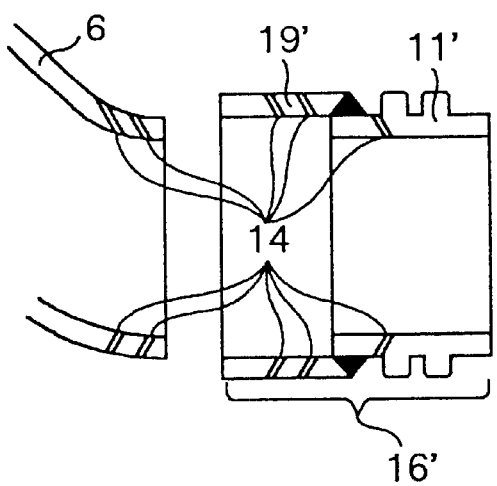
Figure 15D:
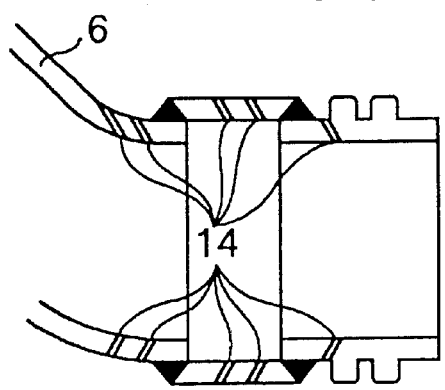
Figure 16A:
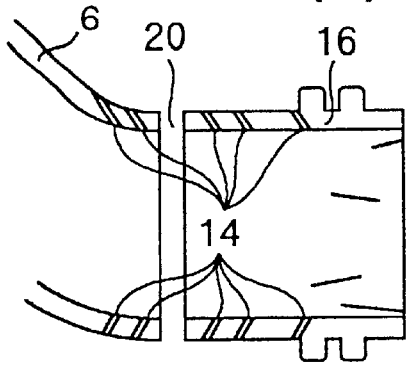
FIGS. 16(a)–16(g) are views showing a repair method (procedure) for a transition piece of still another embodiment in accordance with the present invention.
Figure 16B:
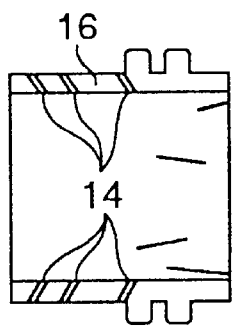
Figure 16C:
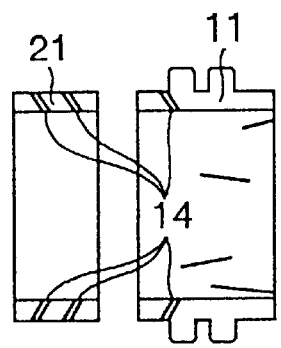
Figure 16D:
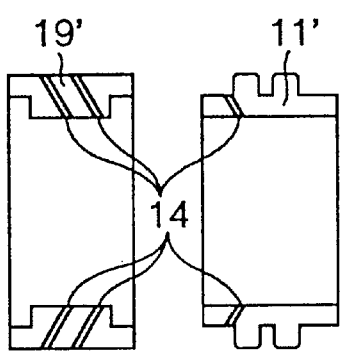
Figure 16E:
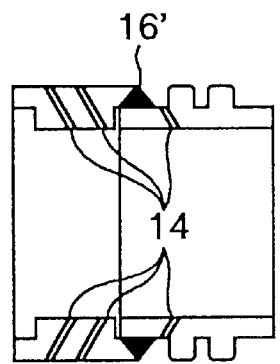
Figure 16F:
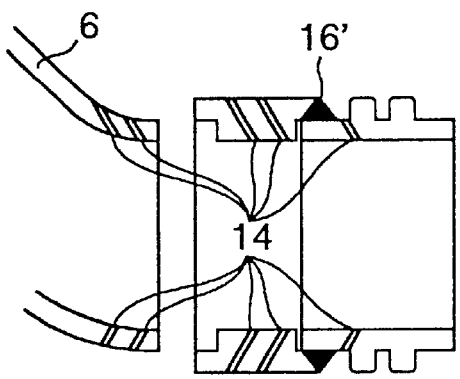
Figure 16G:
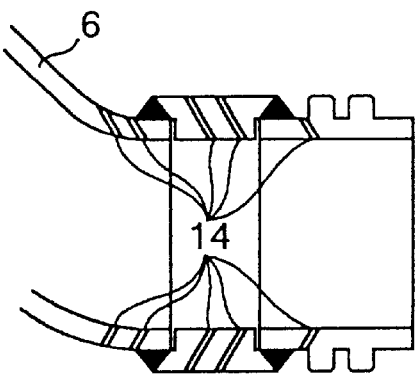
Figure 17A:
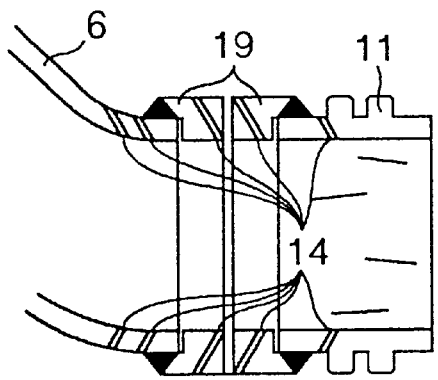
FIGS. 17(a)–17(d) are views showing a repair method (procedure) for a transition piece of still another embodiment in accordance with the present invention.
Figure 17B:
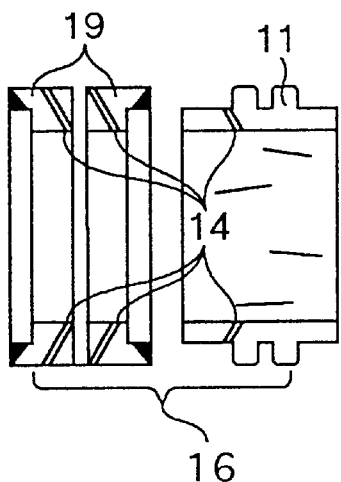
Figure 17C:
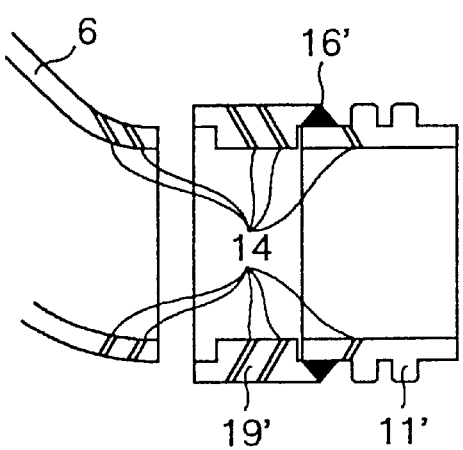
Figure 17D:
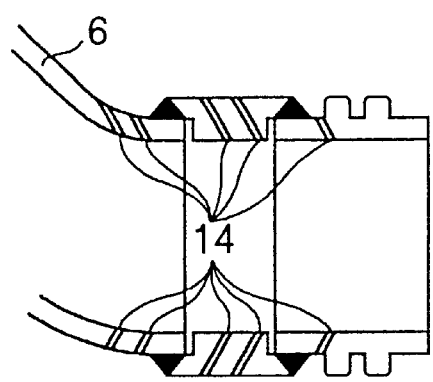

Further, since the load environment of an actual turbine at an actual power station varies, the initial cooling design is sometimes not necessarily the optimum design. However, when the damaged outlet portion 16 is cut off, the degree of damage on the surface is evaluated, by which the arrangement of the cooling holes 14 can be optimized in the direction of the gas turbine rotating shaft as shown in FIG. 10 and in the circumferential direction as shown in FIG. 11 to restrain a local high-temperature zone.

Further, as shown in FIGS. 12(*a*)–12(*g*), in order to restrain creep deformation, the plate thickness of the transition piece 6 used continuously is preferably made larger than that of the outlet portion 16 capable of being replaced and repaired. In this case, for the transition piece 6 once replaced, as shown in FIG. 13(*a*), the damaged outlet portion 16 is cut off in the cutting plane 20 in which cutting operation is easy, and further the cut-off outlet portion 16 shown in FIG. 13(*b*) is divided into the picture frame portion 11 having ribs and the region 21 with a constant plate thickness as shown in FIG. 13(*c*). Thereby, wear and cracks occurred in the picture frame portion 11 are repaired to reuse the picture frame portion 11.

Further, as shown in FIGS. 12(*a*)–14(*g*), the outlet portion 16 is cut off in the cutting plane 20, and is divided into the picture frame portion 11 having ribs and the region 21 with a constant plate thickness as shown in FIGS. 14(*b*) and 14(*c*), and a picture frame portion 11 with a small outside diameter may be welded instead.

As shown in FIGS. 15(*a*)–15(*d*), a connecting member 19' formed with the cooling holes 14 and having an inside diameter containing the transition piece 6 is welded to the picture frame portion 11' to form a replacement outlet portion 16', and the connecting member 19' may be welded to the transition piece 6 as shown in FIG. 15(*d*).

Further, the outlet portion 16 is cut off in the cutting plane 20 as shown in FIG. 16(*a*), and is divided into the picture frame portion 11 having ribs and the region 21 with a constant plate thickness as shown in FIG. 16(*c*). A connecting member 19' having a stepped inside diameter that is equal to the outside diameter of the transition piece 6 and the picture frame portion 11' is prepared, and the replacement outlet portion 16' is welded.

With regard to a transition piece 6 which has already exchanged or repaired, a connecting member 19 has an inner diameter at both ends thereof slightly larger than an outer diameter of the transition piece 6 and a picture frame portion 11, and another inner diameter at a central portion thereof substantially the same as an inner diameter of the transition piece 6 and the picture frame portion 11. As shown in FIG. 17(*a*), the connecting member 19 for length adjustment is cut. As shown in FIG. 17(*b*), the cut outlet portion 16 is divided into a picture frame portion 11 having ribs and the cut connecting member 19. Wear damage, cracks and the like resulted on the picture frame portion 11 are repaired for reuse.

Further, as shown in FIG. 17(*c*), another picture frame portion 11' and another connecting member 19' which are manufactured in advance are welded to each other and then is welded to the transition piece 6 as shown in FIG. 17(*d*).

According to the present invention, the cutoff of the outlet portion from the transition piece can be made easy, the replacement and repair of outlet portion can be made easy, and energy saving, increased strength, prolonged service life, and decreased repair and inspection manpower can be achieved.

What is claimed is:

1. A repair method for a gas turbine having a compressor for compressing air as a working fluid, a combustor for producing combustion gas by mixing fuel with the compressed air, and a turbine for generating rotational power at the time of expansion of the combustion gas, said method comprising:

providing, on an outlet portion of a transition piece for transferring said working fluid to said turbine, a region parallel with the direction of rotating shaft of said turbine, cooling holes in said region so that the longitudinal intervals thereof are lengthened, and a picture frame portion to secure stiffness of an outlet of said outlet portion, and cutting said outlet portion at a portion where the longitudinal intervals of said cooling holes are lengthened to separate said picture frame portion from said transition piece, and welding another picture frame portion prepared in advance to the cut portion for replacement.

2. The repair method for a gas turbine according to claim 1, wherein said picture frame portion prepared in advance is another picture frame portion that has been cut from another transition piece and has been repaired for reuse.

3. The repair method for a gas turbine according to claim 1, wherein by grinding an end face of said cut-off picture frame portion, length of the whole of said transition piece is adjusted.

4. The repair method for a gas turbine according to claim 1, wherein said picture frame portion is welded to the cut portion via a connecting member.

* * * * *